United States Patent
Ushiroda et al.

(10) Patent No.: US 7,325,640 B2
(45) Date of Patent: Feb. 5, 2008

(54) POWER TRANSMISSION SYSTEM FOR FOUR-WHEEL DRIVE VEHICLE

(75) Inventors: Yuichi Ushiroda, Okazaki (JP); Kaoru Sawase, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 181 days.

(21) Appl. No.: 11/001,070

(22) Filed: Dec. 2, 2004

(65) Prior Publication Data

US 2005/0121248 A1 Jun. 9, 2005

(30) Foreign Application Priority Data

Dec. 4, 2003 (JP) .............................. 2003-406021

(51) Int. Cl.
*B60K 17/344* (2006.01)
*B60K 17/35* (2006.01)

(52) U.S. Cl. .................... 180/248; 180/249; 701/69

(58) Field of Classification Search ............. 180/197, 180/233, 248, 249; 701/69, 70, 84, 86

See application file for complete search history.

(56) References Cited

U.S. PATENT DOCUMENTS

| 5,265,020 A | | 11/1993 | Nakayama |
| 5,272,635 A | * | 12/1993 | Nakayama .................. 701/89 |
| 5,450,919 A | * | 9/1995 | Shitani ....................... 180/233 |
| 5,605,201 A | * | 2/1997 | McGinn et al. ............. 180/233 |
| 5,701,247 A | * | 12/1997 | Sasaki ........................... 701/1 |
| 5,839,535 A | * | 11/1998 | Arai ............................ 180/197 |
| 6,131,054 A | | 10/2000 | Shibahata |
| 6,145,614 A | * | 11/2000 | Kimura et al. .............. 180/248 |
| 6,453,228 B1 | * | 9/2002 | Shimada ....................... 701/89 |
| 6,845,838 B2 | * | 1/2005 | Wakao et al. ............... 180/248 |
| 7,048,084 B2 | * | 5/2006 | Shigeta et al. .............. 180/248 |

FOREIGN PATENT DOCUMENTS

| DE | 4112638 A1 | 10/1991 |
| EP | 0844129 A2 | 5/1998 |
| JP | 6-18276 Y2 | 5/1994 |
| JP | 7-164910 A | 6/1995 |
| JP | 3063628 B2 | 5/2000 |
| JP | 2002-127772 A | 5/2002 |

\* cited by examiner

*Primary Examiner*—Lesley D. Morris
*Assistant Examiner*—Marc A. Scharich
(74) *Attorney, Agent, or Firm*—Birch, Stewart, Kolasch & Birch, LLP (57) ABSTRACT

A power transmission system for a four-wheel drive vehicle comprises a power transmission mechanism provided in a vehicle arranged such that power is always transmitted to one of two pairs of wheels consisting of a pair of front wheels and a pair of rear wheels, to transmit power to the other pair of wheels, and a differential gear unit arranged between left and right wheels in the other pair, to distribute the power transmitted from the power transmission mechanism to the other pair, between the left and right wheels. The differential gear unit is a torque-sensitive differential gear unit with a differential limiting function for producing a differential limiting force between the left and right wheels, depending on power transmitted thereto, and a power transmission control means controls the power transmitted from the power transmission mechanism to the differential gear unit according to a driving state of the vehicle.

15 Claims, 4 Drawing Sheets

POWER TRANSMISSION SYSTEM FOR FOUR-WHEEL DRIVE VEHICLE

CROSS-REFERENCE TO A RELATED APPLICATION

This nonprovisional application claims priority under 35 U.S.C. § 119(a) on Patent Application No. 2003-406021 filed in Japan on Dec. 4, 2003, the entire contents of which are hereby incorporated by reference.

BACKGROUND OF THE INVENTION

1. Field of the Invention

This invention relates to a power transmission system for four-wheel drive vehicle, specifically to a power transmission system which adjusts the distribution of power to the front and rear wheels of a vehicle according to the driving state of the vehicle.

2. Description of the Related Art

In recent years, electronic controlled on-demand four-wheel drive vehicles are in practical use widely. The related art is disclosed in Japanese Unexamined Patent Publication No. 2002-127772 (US2002/0055416A1), for example.

The four-wheel drive vehicle disclosed in this patent publication is based on a front-engine/front-drive vehicle, and arranged to supply power from an engine to the front wheels via an automatic transmission and supply part of the power from the engine to the rear wheels via a transfer clutch.

The amount of power transmitted to the rear wheels is adjusted by controlling the engaging force of the transfer clutch. By this, the distribution of power between the front wheels and the rear wheels is changed to achieve behaviors of the vehicle suitable for its driving state, such as ease of turning at an early stage of steering, restriction of slip in rapid acceleration, and stability in deceleration.

However, since the power transmission system disclosed in the above patent publication can adjust only the distribution of power between the front wheels and the rear wheels, there is a limit in controlling the turning characteristics of the vehicle, specifically in controlling the understeer and oversteer of the vehicle. Hence, for this control, a braking force control device, a traction control device, etc. need to be used together, which leads to complicated overall system structure and control, and hence problems such as increase in vehicle weight and significant increase in production cost.

SUMMARY OF THE INVENTION

This invention has been made in view of the above problems. An object of the invention is to provide a power transmission system for four-wheel drive vehicle which can control the turning characteristics of the vehicle appropriately, avoiding increase in vehicle weight and significant increase in production cost.

In order to achieve the above object, a power transmission system for four-wheel drive vehicle according to the present invention comprises a power transmission mechanism provided in a vehicle arranged such that power is always transmitted to one of two pairs of wheels consisting of a pair of front wheels and a pair of rear wheels, to transmit power to the other pair of wheels; a power transmission control means for controlling the power transmission mechanism to adjust the power transmitted to said other pair of wheels; and a differential gear unit arranged between left and right wheels in said other pair, to distribute the power transmitted from the power transmission mechanism to said other pair, between the left and right wheels in said other pair, wherein:

the differential gear unit is a torque-sensitive differential gear unit with a differential limiting function for producing a differential limiting force between the left and right wheels in said other pair, depending on power transmitted thereto, and the power transmission control means controls the power transmitted from the power transmission mechanism to the differential gear unit according to a driving state of the vehicle.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PRESENT INVENTION

A first embodiment in which the present invention is embodied as a power transmission system for an electronic controlled on-demand four-wheel drive vehicle based on a front-engine/front-drive vehicle will be described below.

Figure 1:
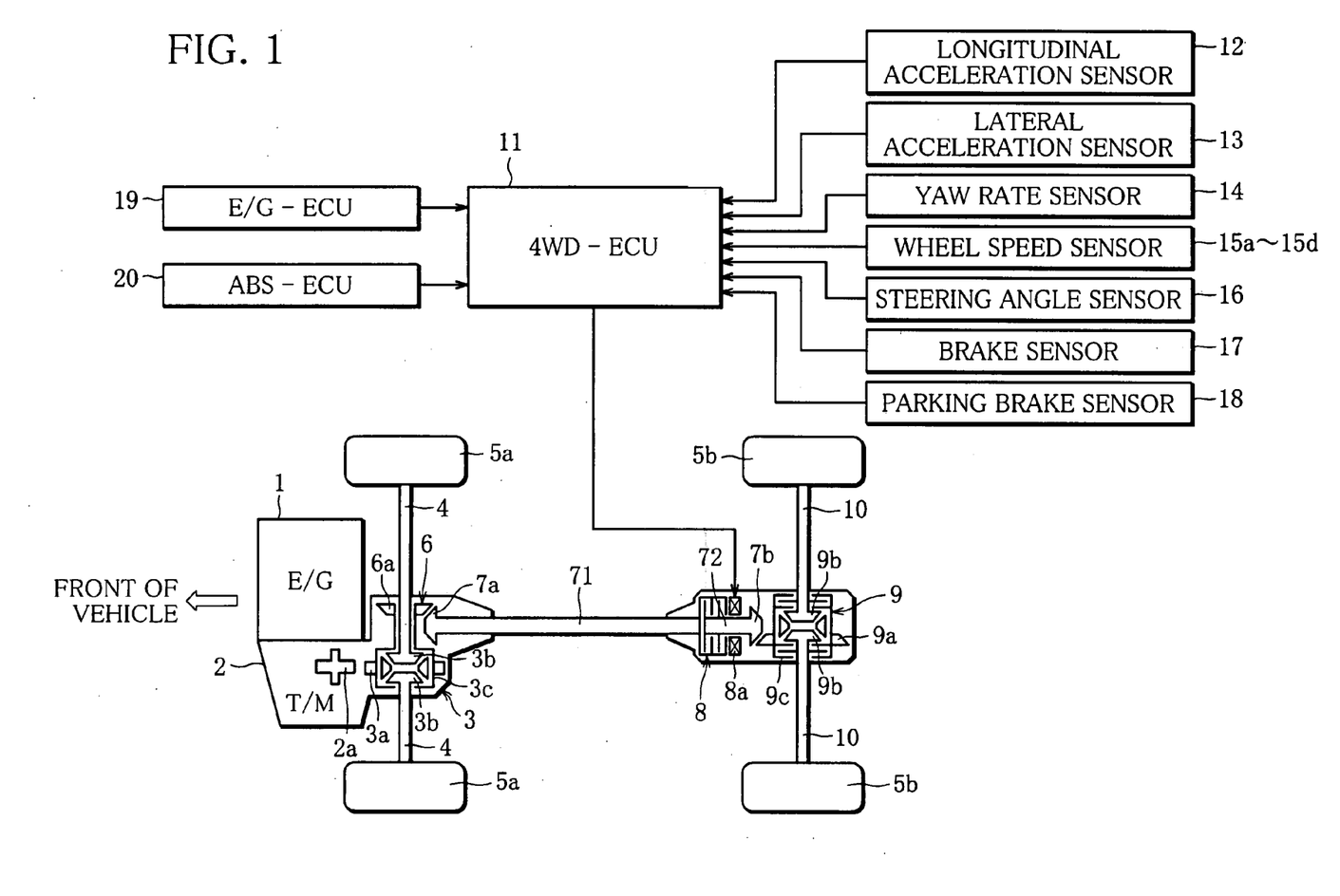
FIG. 1 is a diagram showing the overall structure of a power transmission system for four-wheel drive vehicle according to a first embodiment of the invention.

FIG. 1 is a diagram showing the overall structure of a power transmission system for four-wheel drive vehicle according to the first embodiment. An automatic transmission 2 is connected to a transverse-mounted engine 1 (power source). A ring gear 3a of a front differential gear unit 3 (hereinafter referred to as front differential) engages with an output gear 2a of the automatic transmission 2. Left and right side gears 3b of the front differential 3 are connected with the left and right front wheels 5a, each by a drive shaft 4, so that power from the engine 1 is transmitted to the front wheels 5a via the front differential 3. A ring gear 6a of a power-take-off unit 6 (hereinafter referred to as PTU) is connected with a differential case 3c for the front differential 3, and a pinion gear 7a at the front end of a front propeller shaft 71 engages with the ring gear 6a. The automatic transmission 2, the front differential 3 and the PTU 6 are arranged in a common casing.

An electronic controlled coupling 8 (power transmission mechanism) is provided between a rear part of the front propeller shaft 71 and a rear part of a rear propeller shaft 72. A pinion gear 7b at the rear end of the propeller shaft 72 engages with a ring gear 9a of a rear differential gear unit 9 (hereinafter referred to as rear differential). Left and right side gears 9b of the rear differential 9 are connected with the left and right rear wheels 5b, each by a drive shaft 10.

The electronic controlled coupling 8 can control power transmitted to the rear differential 9 by controlling power transmitted from the front propeller shaft 71 to the rear propeller shaft 72 by adjusting the engaging force of an electromagnetic clutch 8a provided therein. By this operation of the electronic controlled coupling 8, the ratio of the power from the engine 1 supplied to the front wheels 5a to that supplied to the rear wheels 5b can be adjusted to any value between 100:0 and 50:50, for example.

As the rear differential 9, a torque-sensitive limited slip differential (hereinafter referred to as LSD) is provided. The LSD 9 includes a torque-sensitive differential limiting mechanism 9c for producing a differential limiting force depending on a torque supplied via the rear propeller shaft 72 and thereby limiting differential motion between the left and right wheels. For the torque-sensitive differential limiting mechanism 9c, a known structure such as a helical gear type structure or a cam type structure is used.

In the interior of the vehicle, an ECU for four-wheel drive 11 (power transmission control means) is provided, in addition to an engine control ECU, a shift control ECU, an ABS control ECU, etc. Like the other ECUs, the ECU for four-wheel drive 11 comprises an input/output unit, memory (ROM, RAM, etc.) for storing control programs, control maps, etc., a central processing unit (CPU), a timer counter, etc.

To the input side of the ECU for four-wheel drive 11, there are connected various sensors such as a longitudinal acceleration sensor 12 for detecting the longitudinal acceleration Gx of the vehicle, a lateral acceleration sensor 13 for detecting the lateral acceleration Gy of the vehicle, a yaw rate sensor 14 (turning state detecting means) for detecting the yaw rate Yr (actual yaw rate) of the vehicle, wheel speed sensors 15a to 15d for detecting the wheel speeds Vfl, Vfr, Vrl, Vrr of the individual wheels of the vehicle, a steering angle sensor 16 for detecting the steering angle St, a brake sensor 17 for detecting brake operation information Bk and a parking brake sensor 18 for detecting parking brake operation information Pbk. Also the engine control ECU 19 and the ABS control ECU 20 are connected to the input side of the ECU for four-wheel drive 11. To the output side of the ECU for four-wheel drive 11, various devices including the above-mentioned electromagnetic clutch 8a of the electronic controlled coupling 8 are connected.

The ECU for four-wheel drive 11 controls the engaging force of the electromagnetic clutch 8a of the electronic controlled coupling 8 based on detection information from the above-mentioned various sensors. This control is performed not only for purposes general for the electronic controlled on-demand four-wheel drive vehicle, such as appropriate power distribution between the front wheels 5a and the rear wheels 5b to achieve ease of turning at an early stage of steering, restriction of slip in rapid acceleration, and stability in deceleration. In the present embodiment, this control is performed also for controlling the input torque supplied to the rear differential 9 to adjust the differential limiting force of the rear differential 9 to thereby relieve oversteer and understeer in the vehicle's turning. The latter control is required while the vehicle is turning. Hence, when it is determined that the vehicle is turning, for example based on the steering angle St, the yaw rate Yr, etc., the former control switches to the latter control. In the other situations, the former control is performed. The detailed explanation of the former control will be omitted since it is similar to that disclosed in Japanese Unexamined Patent Publication No. 2002-127772 (US2002/0055416A1) mentioned above as prior art, for example. The latter control will be described in detail below.

Figure 2:
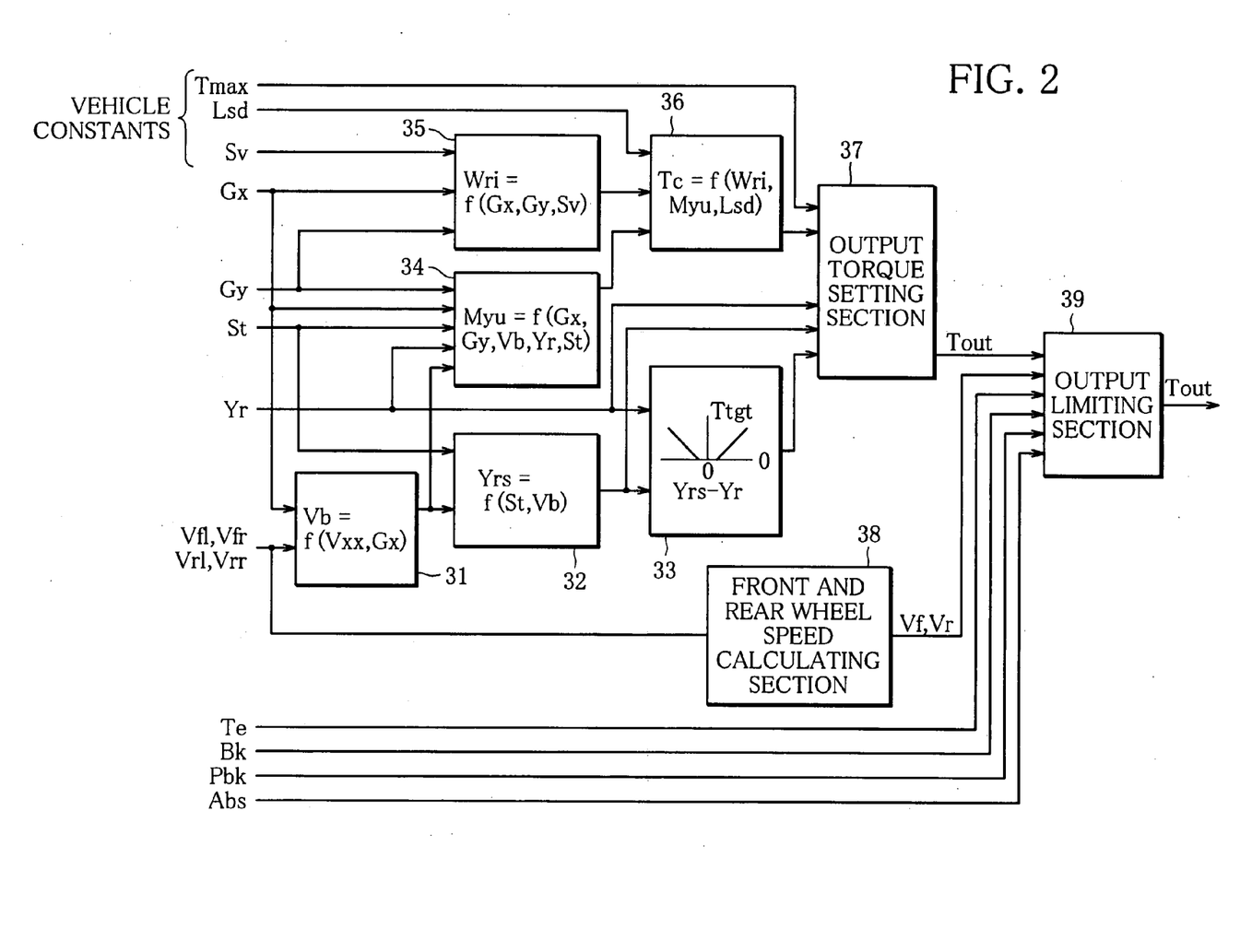
FIG. 2 is a block diagram showing a procedure for calculating a rear-wheel output torque in the power transmission system of FIG. 1.

An input torque to be supplied to the rear differential 9 is calculated as a rear-wheel output torque Tout according to the procedure shown in the block diagram of FIG. 2. For this calculation, vehicle constants, which are specific to individual vehicles, are used in addition to detection information from the above-mentioned various sensors. As the vehicle constants, the maximum torque Tmax (maximum amount for power transmitted) that the electronic controlled coupling 8 can transmit to the rear differential 9, an LSD characteristic Lsd (for example, a differential-limiting-force against input-torque characteristic), vehicle factors Sv (for example, the vehicle weight W, the wheel base L, etc.) are fed in advance.

The longitudinal acceleration Gx detected by the longitudinal acceleration sensor 12 and the wheel speeds Vfl, Vfr, Vrl, Vrr of the individual wheels detected by the wheel speed sensors 15a to 15d are fed to a body speed calculating section 31. The body speed calculating section 31 calculates the body speed Vb based on the information fed. In the calculation of the body speed Vb, for example a procedure disclosed in Japanese Patent No. 3063628 is employed. In this procedure of which details will not be given here, the body speed Vb is calculated based on the wheel speed of the third fastest wheel of the four, which is, for example, the wheel speed of the rear inner wheel when the vehicle is turning. When any of the wheels is slipping, the body speed Vb is calculated based on the longitudinal acceleration Gx.

The body speed Vb calculated by the body speed calculating section 31 and the steering angle St detected by the steering angle sensor 16 are fed to a reference yaw rate calculating section 32. The reference yaw rate calculating section 32 calculates a reference yaw rate Yrs (target yaw rate) based on the information fed, according to expression (1):

$$Yrs = St \times Vb/(1 + A \times Vb^2)/L \qquad (1)$$

where A is the stability factor of the vehicle, and L the wheel base. The reference yaw rate Yrs obtained means an ideal yaw rate in the vehicle turning with the current body speed Vb and steering angle St.

The reference yaw rate Yrs calculated by the reference yaw rate calculating section 32 and the actual yaw rate Yr detected by the yaw rate sensor 14 are fed to a target torque setting section 33. The target torque setting section 33 calculates a target torque Ttgt (target amount for power transmitted) to be supplied to the rear differential 9, based on the information fed. The target torque Ttgt is calculated as an input torque required to be supplied to the rear differential 9 in order to change the yawing moment acting on the vehicle to correct the actual yaw rate Yr to the reference yaw rate Yrs. Specifically, as a map in FIG. 2 shows, the region in which the difference between the reference yaw rate Yrs and the actual yaw rate Yr is close to zero is considered as a dead zone, and the target torque Ttgt is set to zero in this region. In the region in which the absolute value of the difference is a predetermined value or greater, the target torque Ttgt is set to increase in proportion as the absolute value of the difference increases.

The longitudinal acceleration Gx detected by the longitudinal acceleration sensor 12, the lateral acceleration Gy detected by the lateral acceleration sensor 13, the steering angle St detected by the steering angle sensor 16, the yaw rate Yr detected by the yaw rate sensor 14 and the body speed Vb calculated by the body speed calculating section 31 are fed to a coefficient-of-friction-on-road estimating section 34. The coefficient-of-friction-on-road estimating section 34 estimates the coefficient of friction on a road Myu based on the information fed.

The details of how to estimate the coefficient of friction on a road Myu will be omitted since it is known, for example from Japanese Examined Utility Model Publication No. Hei 6-18276. To put it briefly, considering that the incidence of the vehicle's skidding during turning correlates with the coefficient of friction on a road, the estimated value for the lateral acceleration is calculated from the vehicle speed in turning, the steering angle, etc., according to an arithmetic expression. Then, based on the ratio between the estimated value for the lateral acceleration thus calculated and the actual measurement value for the lateral acceleration, namely the value detected by the sensor, the coefficient of friction on the road is obtained. For example, when the ratio of the estimated value to the actual measurement value for the lateral acceleration is approximately equal to 1, it is considered that the vehicle will not skid and that the coefficient of friction on the road is high. When the ratio is less than 1 and the vehicle is skidding, it is considered that the coefficient of friction on the road is one corresponding to this ratio.

The vehicle factors Sv as vehicle constants, the longitudinal acceleration Gx detected by the longitudinal acceleration sensor 12 and the lateral acceleration Gy detected by the lateral acceleration sensor 13 are fed to an inner-wheel load calculating section 35. The inner-wheel load calculating section 35 calculates a rear-inner-wheel load Wri based on the information fed. The rear-inner-wheel load Wri means a load exerted on the rear inner wheel, namely the rear wheel located inside in the vehicle's turning, and is calculated in the procedure described below.

As the vehicle turns, the load exerted on the front and rear wheels 5a and 5b varies, from that exerted when the vehicle is at rest. First, a longitudinal load shifting quantity ΔWx, which means an amount of the load shifting between the front wheels 5a and the rear wheels 5b, is obtained according to expression (2):

$$\Delta Wx = W \times Gx \times hg/L \qquad (2)$$

where W is the vehicle weight, hg the height of gravitational center, and L the wheel base, which are fed in advance as vehicle factors Sv.

Further, a lateral load shifting quantity ΔWyr, which means an amount of the load shifting between the left rear wheel and the right rear wheel is obtained according to expression (3):

$$\Delta Wyr = W \times Gy \times \{hs/(1+Kf/Kr-W \times hs/Kr)+Lf \times hr/L\}/Tr \qquad (3)$$

where Tr is the rear wheel tread, hs the height of gravitational center minus the roll height of center of gravity, Kf the front-wheel roll stiffness, Kr the rear-wheel roll stiffness, Lf the distance between the front wheel axle and the center of gravity, and hr the rear-wheel roll center height. These are fed in advance as vehicle factors Sv.

Next, the rear-inner-wheel load Wri is obtained according to expression (4):

$$Wri = (Wr \times 9.8 + \Delta Wx)/2 - \Delta Wyr \qquad (4)$$

where Wr is the load on the rear wheels at rest.

The coefficient of friction on the road Myu estimated by the coefficient-of-friction-on-road estimating section 34, the rear-inner-wheel load Wri calculated by the inner-wheel load calculating section 35, and the LSD characteristic Lsd fed as a vehicle constant are fed to a minimum torque calculating section 36. The minimum torque calculating section 36 calculates a minimum torque Tc (predetermined value, critical amount for power transmitted) based on the information fed. As mentioned above, in the rear differential 9, the differential limiting force acts depending on the input torque supplied, by means of the torque-sensitive differential limiting mechanism 9c. Depending on this differential limiting force, the turning moment acting on the vehicle changes due to slip of the rear inner wheel located inside in turning of the vehicle. As the minimum torque Tc, a minimum input torque required to be supplied to make the rear inner wheel slip is calculated.

Figure 3:
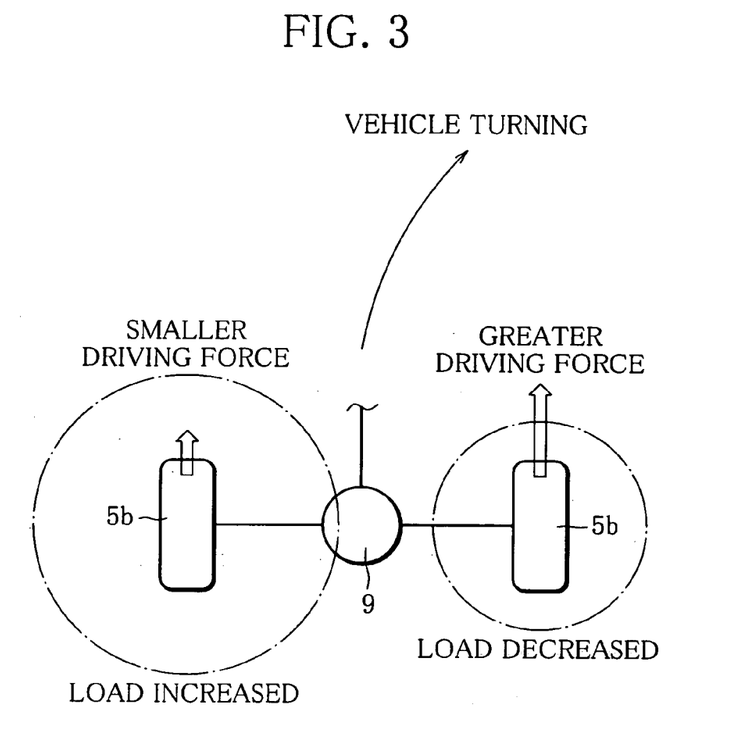
FIG. 3 is an illustration showing how driving forces are exerted via the left and right rear wheels when a four-wheel drive vehicle having the power transmission system of FIG. 1 is turning.

FIG. 3 is an illustration showing how driving forces are exerted via the left and right rear wheels 5b when the vehicle is turning. For example, when the vehicle turns right as shown in FIG. 3, the load on the left rear wheel 5b located outside in turning increases while the load on the right rear wheel 5b located inside in turning decreases. In this situation, the power supplied to the rear differential 9 via the electronic controlled coupling 8 is distributed between the left and right rear wheels 5b according to the LSD characteristic Lsd. Thus, in normal grip running, torque is transferred from the wheel located outside in turning and revolving at higher speed, to the wheel located inside in turning and revolving at lower speed, by means of the toque-sensitive differential limiting mechanism 9c, so that a greater driving force is exerted via the right rear wheel 5b. In this state, when the input torque supplied to the rear differential 9 is increased gradually, the differential limiting force of the LSD 9 increases, so that the driving force exerted via the right rear wheel 5b gradually increases and exceeds the gripping force which is determined by the load on the right rear wheel 5b and the coefficient of friction on the road Myu. As a result, the right rear wheel 5b starts slipping, and the gripping force decreases rapidly. As the minimum torque Tc, the critical input torque causing this situation is calculated.

Hence, by supplying a torque equal to or greater than the minimum torque Tc to the rear differential 9, it is possible to make the rear inner wheel 5b slip to make the revolving speed of the rear inner wheel 5b higher than the revolving speed of the rear outer wheel 5b. In this state, when the differential motion is limited, torque is transferred from the rear inner wheel 5b to the rear outer wheel 5b, so that a yawing moment having such direction that promotes the turning of the vehicle is produced. Conversely, when a torque less than the minimum torque Tc is supplied to the rear differential 9 and the differential motion is limited while the rear inner wheel is kept gripping the road, a yawing moment having such direction that hinders the turning of the vehicle is produced.

The minimum torque Tc calculated by the minimum torque calculating section 36, the reference yaw rate Yrs calculated by the reference yaw rate calculating section 32, the target torque Ttgt calculated by the target torque setting section 33, the maximum torque Tmax that can be transmitted to the rear differential 9, which is fed as a vehicle constant, and the yaw rate Yr detected by the yaw rate sensor 14 are fed to an output torque setting section 37. The output torque setting section 37 calculates a rear-wheel output torque Tout to be supplied to the rear differential 9 via the electronic controlled coupling 8, based on the information fed.

Figure 4:
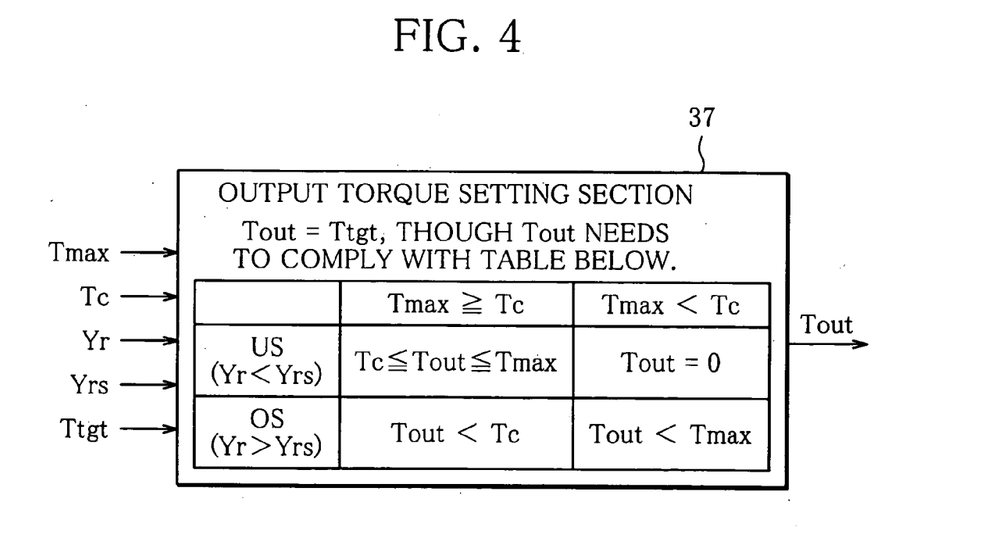
FIG. 4 is a block diagram showing the details of an output torque setting section of the power transmission system of FIG. 1.

Basically, the rear-wheel output torque Tout is set to the target torque Ttgt. However, due to the above-described principle of producing a yawing moment utilizing the characteristic of the torque-sensitive LSD 9c, there are cases in which a yawing moment having an appropriate direction cannot be produced. Hence, as seen in FIG. 4 that shows the details of the output torque setting section 37, the rear-wheel output torque Tout is set in different ways, in accordance with the relation in magnitude between the maximum torque. Tmax and the minimum torque Tc and the turning state of the vehicle (oversteer or understeer). Here, the turning state is not considered on the basis of neutral steer. It is considered as a direction in which the actual yaw rate Yr deviates from the reference yaw rate Yrs.

The description below will be made based on FIG. 4. When the maximum torque Tmax is equal to or greater than the minimum torque Tc (Tmax≧Tc), it is both possible to supply an input torque equal to or greater than the minimum torque Tc to the rear differential 9 to produce a yawing moment having such direction that promotes the turning of the vehicle, and to supply an input torque less than the minimum torque Tc to the rear differential 9 to produce a yawing moment having such direction that hinders the turning of the vehicle.

Hence, when the maximum torque Tmax is equal to or greater than the minimum torque Tc (Tmax≧Tc), if the vehicle is turning in understeer state (Yr<Yrs), the rear-wheel output torque Tout is set to be between the minimum torque Tc and the maximum torque Tmax. For example, when the target torque Ttgt is calculated to be less than the minimum torque Tc, the rear-wheel output torque Tout is set to the minimum torque Tc. When the target torque Ttgt is calculated to be between the minimum torque Tc and the maximum torque Tmax, the rear-wheel output torque Tout is set to the target torque Ttgt. When the target torque Ttgt is calculated to be greater than the maximum torque Tmax, the rear-wheel output torque Tout is set to the maximum torque Tmax. As a result, a yawing moment having such direction that promotes the turning of the vehicle acts on the vehicle, so that the understeer is relieved.

When the maximum torque Tmax is equal to or greater than the minimum torque Tc (Tmax≧Tc), if the vehicle is turning in oversteer state (Yr>Yrs), the rear-wheel output torque Tout is set to be less than the minimum torque Tc. For example, when the target torque Ttgt is calculated to be less than the minimum torque Tc, the rear-wheel output torque Tout is set to the target torque Ttgt. When the target torque Ttgt is calculated to be equal to or greater than the minimum torque Tc, the rear-wheel output Tout is set to a value less than the minimum torque Tc. As a result, a yawing moment having such direction that hinders the turning of the vehicle acts on the vehicle, so that the oversteer is relieved.

When the maximum torque Tmax is less than the minimum torque Tc (Tmax<Tc), it is impossible to supply an input toque equal to or greater than the minimum torque Tc to the rear differential 9 to make the rear inner wheel 5b slip to produce a yawing moment that promotes the turning of the vehicle. Only a yawing moment that hinders the turning of the vehicle can be produced, while keeping the rear inner wheel 5b gripping the road.

Hence, when the maximum torque Tmax is less than the minimum torque Tc (Tmax<Tc) and the vehicle is turning in understeer state (Yr<Yrs), the rear-wheel output torque Tout is limited to zero, considering that the yawing moment acting on the vehicle cannot be corrected.

When the maximum torque Tmax is less than the minimum torque Tc (Tmax<Tc) and the vehicle is turning in oversteer state (Yr>Yrs), the rear-wheel output torque Tout is set to be less than the maximum torque Tmax. For example, when the target torque Ttgt is calculated to be less than the maximum torque Tmax, the rear-wheel output torque Tout is set to the target torque Ttgt. When the target torque Ttgt is calculated to be equal to or greater than the maximum torque Tmax, the rear-wheel output torque Tout is set to the maximum torque Tmax. In other words, in this situation, the upper limit of the setting range for the ideal rear-wheel output torque Tout is the minimum torque Tc. However, the rear-wheel output torque Tout that can be produced is limited to the maximum torque Tmax at most. Hence, the rear-wheel output torque Tout is set to the maximum torque Tmax at most. As a result, the oversteer of the vehicle is relieved.

As shown in FIG. 2, the wheel speeds Vfl, Vfr, Vrl, Vrr of the individual wheels are fed to a front and rear wheel speed calculating section 38. The front and rear wheel speed calculating section 38 calculates a front wheel speed Vf and a rear wheel speed Vr based on the information fed, according to expressions (5) and (6):

$$Vf=(Vfl+Vfr)/2 \qquad (5)$$

$$Vr=(Vrl+Vrr)/2 \qquad (6)$$

The rear-wheel output torque Tout calculated by the output torque setting section 37, the front wheel speed Vf and the rear wheel speed Vr calculated by the front and rear wheel speed calculating section 38, the current engine torque Te fed from the engine control ECU 19, the brake operation information Bk detected by the brake sensor 17, the parking brake operation information Pbk detected by the parking brake sensor 18, the ABS monitor Abs (ABS system operation information) fed from the ABS control ECU 20 are fed to an output limiting section 39. The output limiting section 39 feeds the rear-wheel output torque Tout as it is when none of conditions 1) to 5) below are met, and limits the rear-wheel output torque Tout to zero and feeds it when any of conditions 1) to 5) is met.

1) The front wheel speed Vf is less than the rear wheel speed Vr (Vf<Vr).
2) The rear-wheel output torque Tout is greater than the engine torque Te (Tout>Te).
3) The brake is being operated (Bk=ON).
4) The parking brake is being operated (Pbk=ON).
5) The ABS is operating (Abs=ON).

When condition 1) is met, power cannot be transmitted from the front propeller shaft 71 to the rear propeller shaft 72, and hence power from the engine 1 cannot be supplied to the rear wheels 5b via the electronic controlled coupling 8. This means that the input torque supplied to the rear differential 9 cannot be controlled, which means that the yawing moment cannot be corrected utilizing the characteristic of the torque-sensitive LSD 9. Thus, the control is suspended.

When condition 2) is met, it is impossible to supply the rear-wheel output torque Tout greater than the engine torque Te to the rear differential 9. Hence, there is a risk that the turning behavior of the vehicle deteriorates because a differential limiting force appropriate to the driving state of the vehicle cannot be produced. Thus, the control is suspended.

Regarding conditions 3), 4) and 5), the brake, the parking brake and the ABS all affect the torque supplied to the rear differential 9 as disturbance, so that appropriate control cannot be expected. Thus, the control is suspended.

Based on the rear-wheel output torque Tout calculated as described above, the engaging force of the electronic controlled coupling 8 is controlled. Specifically, from a map not shown, the duty ratio is set to a value corresponding to the rear-wheel output torque Tout, and the electromagnetic clutch 8*a* is excited based on the duty ratio to thereby control the engaging force of the electronic controlled coupling 8. As a result, a torque corresponding to the rear-wheel output torque Tout is supplied to the rear differential 9. Based on this controlled supply of the torque, the torque-sensitive differential limiting mechanism 9*c* exerts a differential limiting force on the rear differential 9 according to the characteristic shown in FIG. 3. Thus, when the vehicle is turning in understeer state, a yawing moment having such direction that promotes the turning of the vehicle is produced to relieve the understeer to improve the turning behavior. When the vehicle is turning in oversteer state, a yawing moment having such direction that hinders the turning of the vehicle is produced to relieve the oversteer to improve the stability.

As understood from the above, the power transmission system for four-wheel drive vehicle in this embodiment functions like the braking force control device and the traction control device, which are provided to control general turning characteristics when the vehicle is turning. Hence, these devices can be omitted. The structure of this power transmission system is basically the same as the usual structure for the electronic controlled on-demand four-wheel drive vehicle arranged such that part of power from the engine 1 driving the front wheels 5*a* is supplied to the rear wheels 5*b* via the electronic controlled coupling 8. It is simple, requiring no addition but the torque sensitive LSD 9 and the control by the ECU for four-wheel drive 11 shown in FIG. 2. Thus, this power transmission system can control the turning characteristics of the vehicle appropriately, avoiding increase in vehicle weight and significant increase in production cost.

The output torque setting section 37 determines whether the vehicle is in understeer state or oversteer state, from the actual yaw rate Yr and the reference yaw rate Yrs, and sets the rear-wheel output torque Tout based on the result of determination. Hence, a yawing moment having a direction appropriate to the turning state of the vehicle can be always produced, which makes it possible to control the turning characteristics of the vehicle more appropriately.

The output torque setting section 37 sets the rear-wheel output torque Tout based on the target torque Ttgt obtained from the actual yaw rate Yr and the reference yaw rate Yrs, which is an ideal value for the yaw rate according to the driving state of the vehicle. Hence, the electronic controlled coupling 8 can be controlled in the manner reflecting the driving state of the vehicle. This also contributes to appropriate control on the turning characteristics of the vehicle.

In the present embodiment, the yawing moment acting on the vehicle is changed to hinder the turning of the vehicle or promote the turning of the vehicle by making the rear inner wheel of the turning vehicle slip or grip the road, and the output torque setting section 37 sets the rear-wheel output torque Tout considering the minimum torque Tc required to make the rear inner wheel of the turning vehicle slip as a critical torque. Thus, a yawing moment that promotes the turning of the vehicle and a yawing moment that hinders the turning of the vehicle can be produced assuredly, which makes it possible to control the turning characteristics of the vehicle more appropriately.

In place of controlling the differential limiting force of the rear differential 9 over the slip region and the grip region for the rear inner wheel, namely the rear wheel located inside in turning, the differential limiting force may be controlled within the grip region for the wheel located inside in turning. In this case, as has been explained based on FIG. 3, the greater the differential limiting force of the rear differential 9 is, the greater torque is supplied to the rear inner wheel, so that a yawing moment having such direction that hinders the turning of the vehicle is produced. Hence, in order to produce a yawing moment having such direction that promotes the turning of the vehicle, the differential limiting force is decreased by decreasing an input torque supplied to the rear differential 9. In order to produce a yawing moment having such direction that hinders the turning of the vehicle, the differential limiting force is increased by increasing an input torque supplied to the rear differential 9. This way of control has the effects similar to those produced by the above embodiment.

The output torque setting section 37 sets the rear-wheel output torque Tout, considering the maximum torque Tmax that can be transmitted to the rear differential 9, in addition to the target torque Ttgt and the minimum torque Tc. This prevents the rear-wheel output torque Tout being inappropriately set to a value greater than the maximum torque Tmax, and thereby prevents inappropriate control on the electronic controlled coupling 8.

In addition, the output limiting section 39 prohibits the supply of a torque to the rear differential 9 based on conditions 1) to 5) provided in advance. For example, when it is impossible to supply appropriate power to the rear wheels 5*b* because of revolution difference between the front wheels 5*a* and the rear wheels 5*b* or shortage of the engine torque Te, the control is suspended. Hence, problems that may happen when power is transmitted in an inappropriate situation like this are prevented.

Next, a second embodiment of the present invention will be described. In the second embodiment, the present invention is embodied as a power transmission system for a hybrid four-wheel drive vehicle in which a motor for driving the rear wheels is added to a front-engine/front-drive vehicle. In the second embodiment, many elements are the same in structure as in the first embodiment. Hence, the description below will be focused on differences, while the same elements will be denoted by the same reference numerals and the description thereof will be omitted.

Figure 5:
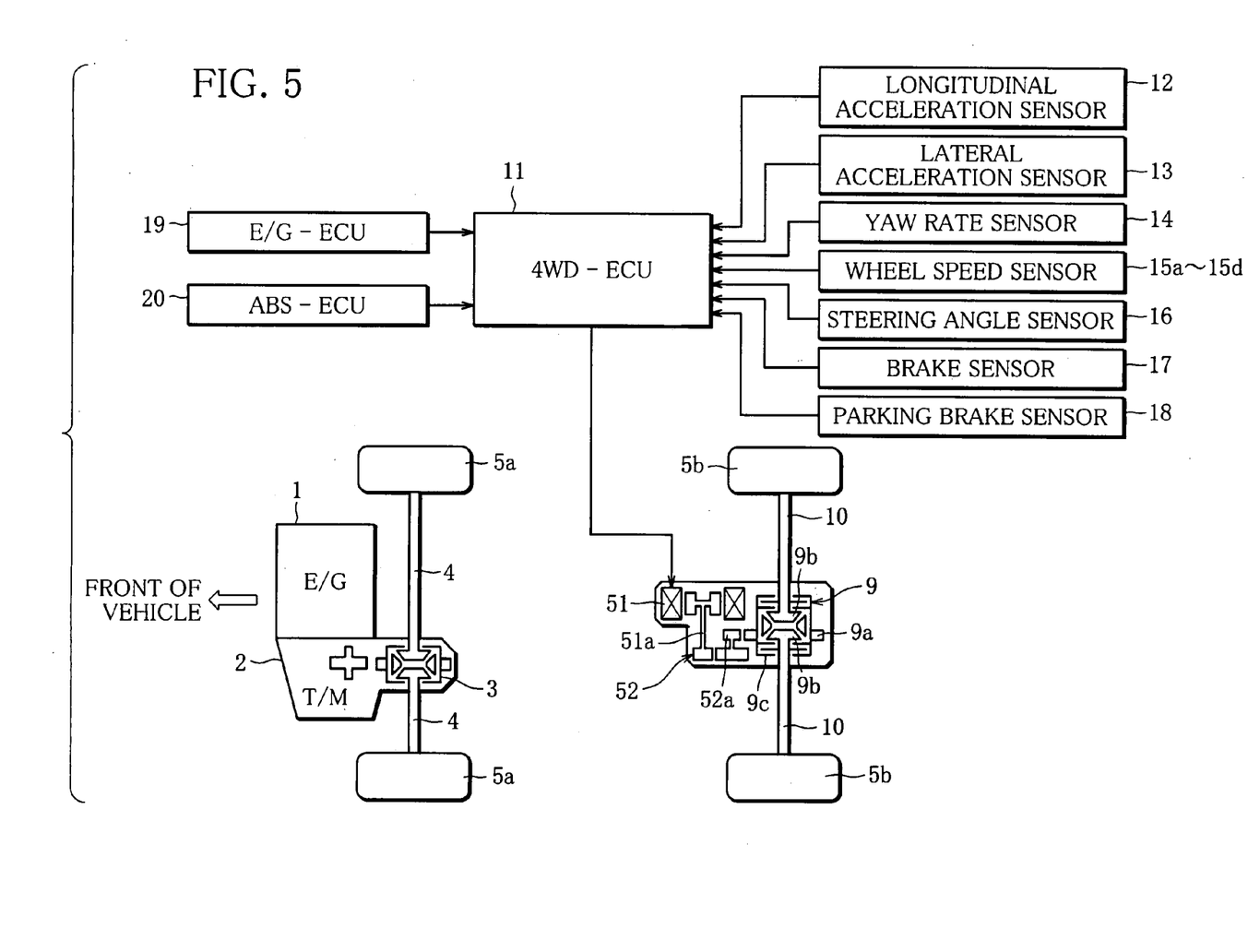
FIG. 5 is a diagram showing the overall structure of a power transmission system for four-wheel drive vehicle according to a second embodiment of the invention.

FIG. 5 is a diagram showing the overall structure of a power transmission system for four-wheel drive vehicle according to the second embodiment. The front-wheel side is quite similar in structure to that for a front-engine/front-drive vehicle. Power from an engine 1 is transmitted to left and right front wheels 5*a* via an automatic transmission 2, a front differential 3 and drive shafts 4.

A motor 51 (second power source) for driving rear wheels 5*b* is provided in a rear part of the vehicle, and a reduction gear mechanism 52 is connected with an output shaft 51*a* of the motor 51. An output gear 52*a* of the reduction gear mechanism 52 engages with a ring gear 9*a* of a rear differential 9 including a torque-sensitive differential limiting mechanism 9*c*, and left and right side gears 9*b* of the rear differential 9 are connected with left and right rear wheels 5*b*, each by a drive shaft 10. In the four-wheel drive vehicle arranged this way, power supplied to the front wheels 5*a* can be adjusted within the limits of the engine output, while power supplied to the rear wheels 5*b* can be adjusted within the limits of the motor output.

In the power transmission system for four-wheel drive vehicle according to the second embodiment having the arrangement described above, an ECU for four-wheel drive 11 sets a rear-wheel output torque Tout according to the procedure shown in FIG. 2 as in the first embodiment, and controls the output of the motor 51 based on the rear-wheel output torque Tout, in place of controlling the engaging force of the electronic controlled coupling 8. It is to be noted that in the second embodiment, an input torque supplied from the motor 51 to the rear differential 9 is controlled independently of the engine 1 on the front wheel 5a side. Consequently, problems with the supply of power to the rear wheels 5b which may happen in the first embodiment under the conditions 1) and 2) do not happen. Hence, the output limitation based on these conditions is not applied to the second embodiment. It is to be noted that as the maximum torque Tmax, a maximum output torque that the motor 51 can supply is used.

Although duplicate explanation will be omitted, the turning characteristics of the vehicle can be controlled appropriately by adjusting the differential limiting force of the rear differential 9 by adjusting the input torque supplied to the rear differential 9, like the first embodiment. The structure is simple only with the motor 51 for driving the rear wheels and the reduction gear mechanism 52 added to the front-engine/front-drive vehicle, and the braking force control device and the traction control device can be omitted. Hence, increase in vehicle weight and significant increase in production cost can be avoided.

Although two embodiments have been described above, the present invention is not limited to these embodiments. For example, in the first embodiment in which the invention is applied to an electronic controlled on-demand four-wheel drive vehicle based on a front-engine/front-drive vehicle and in the second embodiment in which the invention is applied to a hybrid four-wheel drive vehicle with a motor 51 for driving the rear wheels added to a front-engine/front-drive vehicle, an appropriate yawing moment is made to act on the vehicle by adjusting the differential limiting force of the rear differential 9. However, it can be arranged such that the differential limiting force is adjusted not on the rear wheel 5b side but on the front wheel 5a side. Specifically, the invention can be applied to an electronic controlled on-demand four-wheel drive vehicle based on a front-engine/rear-drive vehicle or a hybrid four-wheel drive vehicle with a motor for driving the front wheels added to a front-engine/rear-drive vehicle, to adjust the differential limiting force of the front differential by controlling an input torque supplied to the front differential.

Further, these embodiments are arranged to set the target torque Ttgt to be supplied to the rear differential 9 (or the front differential), based on the reference yaw rate Yrs and the actual yaw rate Yr. However, the present invention is not limited to this. It can be arranged to set the target torque Ttgt according to running states such as the body speed Vb calculated by the body speed calculating section 31, the lateral acceleration Gy detected by the lateral acceleration sensor 13, and a calculated lateral acceleration obtained from the steering angle St detected by the steering angle sensor 16 and the body speed Vb, or driving states such as the body speed Vb, the steering angle St and the throttle position (accelerator position).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission system for a four-wheel drive vehicle, comprising:
    a power transmission mechanism, provided in a vehicle arranged such that power is always transmitted to one of two pairs of wheels consisting of a pair of front wheels and a pair of rear wheels, which transmits power to the other pair of wheels;
    a power transmission control means for controlling the power transmission mechanism to adjust the power transmitted to said other pair of wheels; and
    a differential gear unit arranged between left and right wheels in said other pair, to distribute the power transmitted from the power transmission mechanism to said other pair, between the left and right wheels in said other pair, wherein:
    said differential gear unit is a mechanical-type torque-sensitive limited-slip differential gear unit with a differential limiting function for producing a differential limiting force between the left and right wheels in said other pair depending solely on power transmitted to an input element of the differential gear unit, and
    said power transmission control means controls the power transmitted from the power transmission mechanism to the differential gear unit according to a driving state of the vehicle.

2. The power transmission system for a four-wheel drive vehicle according to claim 1, wherein:
    said power transmission control means includes a turning state detecting means for detecting a turning state of the vehicle and controls the power transmission mechanism according to the turning state detected by the turning state detecting means.

3. The power transmission system for a four-wheel drive vehicle according to claim 2, wherein:
    said power transmission control means sets the power transmitted to the differential gear unit to be a predetermined value or greater to produce a yawing moment having such direction that promotes turning of the vehicle, and sets the power transmitted to the differential gear unit to be less than the predetermined value to produce a yawing moment having such direction that hinders turning of the vehicle.

4. The power transmission system for a four-wheel drive vehicle according to claim 3, wherein:
    said predetermined value is a critical power transmission amount which is an amount of power required to be transmitted to the differential gear in order to produce a yawing moment that promotes turning of the vehicle, by the differential limiting force, when the vehicle is turning.

5. The power transmission system for a four-wheel drive vehicle according to claim 4, wherein:
    said power transmission control means sets a target power transmission amount based on at least either a driving state or a running state of the vehicle, and controls the power transmission mechanism according to the turning state of the vehicle, the target power transmission amount, and the critical power transmission amount.

6. The power transmission system for a four-wheel drive vehicle according to claim 5, wherein:
    said power transmission control means controls the power transmission mechanism according to the turning state of the vehicle, the target power transmission amount, the critical power transmission amount, and a maximum power transmission amount that the power transmission mechanism can transmit.

7. The power transmission system for a four-wheel drive vehicle according to claim 2, wherein:
    said power transmission control means controls the power transmission mechanism according to a target power transmission amount which is set based on at least either a driving state or a running state of the vehicle.

8. The power transmission system for a four-wheel drive vehicle according to claim 7, wherein:

said power transmission control means sets the target power transmission amount based on an actual yaw rate of the vehicle and a target yaw rate which is set based on a driving state of the vehicle.

9. The power transmission system for a four-wheel drive vehicle according to claim 2, wherein:

said power transmission control means decreases the power transmitted to the differential gear unit to produce a yawing moment having such direction that promotes turning of the vehicle, and increases the power transmitted to the differential gear unit to produce a yawing moment having such direction that hinders turning of the vehicle.

10. The power transmission system for a four-wheel drive vehicle according to claim 2, wherein:

said power transmission control means increases the power transmitted to the differential gear unit to produce a yawing moment having such direction that promotes turning of the vehicle, and decreases the power transmitted to the differential gear unit to produce a yawing moment having such direction that hinders turning of the vehicle.

11. The power transmission system for a four-wheel drive vehicle according to claim 1, wherein:

said power transmission mechanism transmits part of power from a power source of power supplied to said one of the two pairs of wheels, to the differential gear unit.

12. The power transmission system for a four-wheel drive vehicle according to claim 11, wherein:

said power transmission control means prohibits transmission of power to the differential gear unit when a revolving speed of said one of the two pairs of wheels is lower than a revolving speed of said other pair, or when output power supplied from the power source is less than an amount of power set to be transmitted to the differential gear unit.

13. The power transmission system for a four-wheel drive vehicle according to claim 11, wherein:

said power transmission mechanism transmits, to the differential gear unit, power from a second power source separate from a power source that supplies power to said one of the two pairs of wheels.

14. The power transmission system for a four-wheel drive vehicle according to claim 1, wherein:

said mechanical-type torque-sensitive limited-slip differential gear unit is one of a helical gear type structure and a cam type structure.

15. The power transmission system for a four-wheel drive vehicle according to claim 1, wherein:

the input element is a ring gear of the differential gear unit.

* * * * *